United States Patent
Mäkelä et al.

(10) Patent No.: US 7,853,402 B2
(45) Date of Patent: Dec. 14, 2010

(54) MONITORING LOCATION OF MINING VEHICLE USING BASE STATIONS IN AT LEAST TWO SECTIONS OF MINE

(75) Inventors: Hannu Mäkelä, Helsinki (FI); Riku Pulli, Tampere (FI); Timo Soikkeli, Pirkkala (FI)

(73) Assignee: Sandvik Mining and Construction OY, Tampere (FI)

( * ) Notice: Subject to any disclaimer, the term of this patent is extended or adjusted under 35 U.S.C. 154(b) by 775 days.

(21) Appl. No.: 10/562,937

(22) PCT Filed: Jun. 28, 2004

(86) PCT No.: PCT/FI2004/000391

§ 371 (c)(1),
(2), (4) Date: Dec. 30, 2005

(87) PCT Pub. No.: WO2005/003808

PCT Pub. Date: Jan. 13, 2005

(65) Prior Publication Data

US 2006/0190165 A1     Aug. 24, 2006

(30) Foreign Application Priority Data

Jul. 3, 2003     (FI)  ................................ 20031007

(51) Int. Cl.
*G01C 21/00*     (2006.01)

(52) U.S. Cl. ........................ 701/207; 701/208; 701/220; 340/941

(58) Field of Classification Search ................ 340/10.1, 340/10.2, 10.4, 10.6, 825.49, 941, 913; 701/207, 701/208, 220, 217
See application file for complete search history.

(56) References Cited

U.S. PATENT DOCUMENTS

| | | | | |
|---|---|---|---|---|
| 4,495,495 A | * | 1/1985 | Ormanns et al. | 340/7.61 |
| 5,603,091 A | * | 2/1997 | Linquist et al. | 455/13.2 |
| 5,905,450 A | * | 5/1999 | Kim et al. | 340/967 |
| 6,188,353 B1 | * | 2/2001 | Mitchell | 342/386 |
| 6,201,497 B1 | * | 3/2001 | Snyder et al. | 342/357.06 |

(Continued)

FOREIGN PATENT DOCUMENTS

EP     1 243 939     9/2002

(Continued)

*Primary Examiner*—Thomas G Black
*Assistant Examiner*—Sze-Hon Kong
(74) *Attorney, Agent, or Firm*—Drinker Biddle & Reath LLP

(57) ABSTRACT

A method and a system for monitoring the location of a mining vehicle in a mine. The first mine section (18) is provided with a wireless network (10) for data transmission between the mining vehicle (1, 1a, 1b) and the mine control system (11). In addition, the network is used for positioning. In the second mine section (21), the location is determined by means of measuring devices provided in the mining vehicle.

14 Claims, 2 Drawing Sheets

U.S. PATENT DOCUMENTS

| | | | |
|---|---|---|---|
| 6,226,572 B1 | 5/2001 | Tojima et al. | |
| 6,480,769 B1* | 11/2002 | Kageyama | 701/23 |
| 6,484,096 B2* | 11/2002 | Wong et al. | 701/213 |
| 6,597,906 B1* | 7/2003 | Van Leeuwen et al. | 455/422.1 |
| 6,616,244 B2* | 9/2003 | Hakkinen | 299/1.05 |
| 6,721,572 B1* | 4/2004 | Smith et al. | 455/456.1 |
| 6,750,765 B1* | 6/2004 | van Wijk | 340/505 |
| 6,839,560 B1* | 1/2005 | Bahl et al. | 455/456.1 |
| 6,859,729 B2* | 2/2005 | Breakfield et al. | 701/216 |
| 7,038,584 B2* | 5/2006 | Carter | 340/539.13 |
| 7,091,852 B2* | 8/2006 | Mason et al. | 340/539.13 |
| 7,127,213 B2* | 10/2006 | Haymes et al. | 455/67.11 |
| 7,139,651 B2* | 11/2006 | Knowlton et al. | 701/50 |
| 7,206,588 B2* | 4/2007 | Moriguchi et al. | 455/456.1 |
| 7,323,991 B1* | 1/2008 | Eckert et al. | 340/572.1 |
| 7,598,856 B1* | 10/2009 | Nick et al. | 340/539.13 |
| 2002/0008625 A1* | 1/2002 | Adams et al. | 340/573.1 |
| 2003/0025602 A1* | 2/2003 | Medema et al. | 340/568.1 |
| 2003/0184475 A1* | 10/2003 | Williams et al. | 342/465 |
| 2004/0021569 A1* | 2/2004 | Lepkofker et al. | 340/568.1 |
| 2004/0174260 A1* | 9/2004 | Wagner | 340/568.1 |
| 2004/0174264 A1* | 9/2004 | Reisman et al. | 340/573.4 |
| 2007/0281745 A1* | 12/2007 | Parkulo et al. | 455/557 |

FOREIGN PATENT DOCUMENTS

| | | |
|---|---|---|
| FI | 110806 | 9/2001 |
| WO | WO 01/07976 | 2/2001 |
| WO | WO 01/69041 | 9/2001 |
| WO | WO 02/054813 | 7/2002 |
| WO | WO 03/012470 | 2/2003 |

* cited by examiner

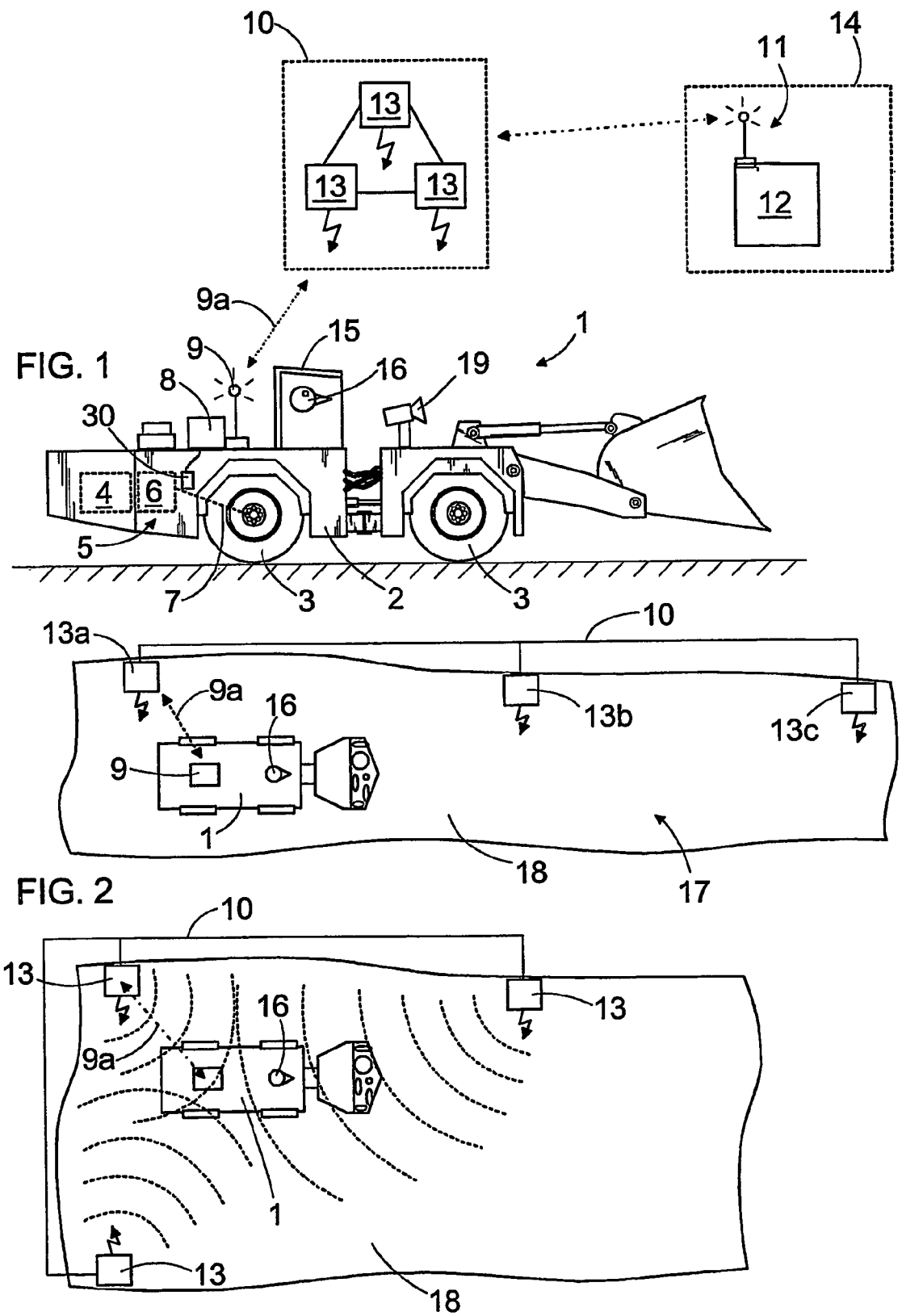

MONITORING LOCATION OF MINING VEHICLE USING BASE STATIONS IN AT LEAST TWO SECTIONS OF MINE

BACKGROUND OF THE INVENTION

The invention relates to a method of monitoring the location of a mining vehicle in a mine, the method comprising: determining data on the location of at least one mining vehicle in the mine; transmitting the location data to a mine control system; and employing the obtained location data in the mine control system for monitoring the operation of the mining vehicle.

The invention further relates to a system of monitoring the location of a mining vehicle in a mine, the system comprising: means for determining the location of a mining vehicle, a mine control system, at least one control unit arranged in the mining vehicle, at least one wireless network for data transmission between the control unit of the mining vehicle and the mine control system, and at least one base station for creating the wireless network.

Different mining vehicles are used in a mine, such as rock drilling rigs, loading vehicles and transport vehicles. The mining vehicles may be manned or unmanned. For monitoring the location of a mining vehicle, it is known to provide predetermined places in a mine with reading devices, which register the mining vehicle and give information on the location of the mining vehicle to the mine control system. However, the building of such fixed infrastructure in a mine is expensive and difficult. Furthermore, reading devices may be damaged in severe mining conditions.

BRIEF DESCRIPTION OF THE INVENTION

The object of the invention is to provide a new and improved method and system for monitoring the location of a mining vehicle in a mine.

The method according to the invention is characterized by forming at least one first section and at least one second section in the mine; creating at least one wireless network for the first mine section, which communicates with the mine control system and includes at least one base station for establishing a data communication connection between the mining vehicle and the wireless network, the mining vehicle being in the coverage area of at least one base station in the first mine section; arranging at least one base station in the second mine section for establishing a data communication connection between the mining vehicle and the wireless network; determining the location of the mining vehicle in the first mine section by means of positioning performed in the wireless network; and determining the location of the mining vehicle in the second mine section by at least one measuring device provided in the mining vehicle, and transmitting the location data to the mine control system over the wireless network.

The system according to the invention is characterized in that the mine comprises at least one first section provided with at least one wireless network, the mining vehicle being in the coverage area of at least one base station in the first mine section; the mine comprises at least one second section provided with at least one base station for establishing a data communication connection between the control unit of the mining vehicle and the mine control system; the location of the mining vehicle in the first mine portion is arranged to be determined using positioning performed in the wireless network; the location of the mining vehicle in the second mine section is arranged to be determined by at least one measuring device provided in the mining vehicle, and location data are arranged to be transmitted in the second mine section over the wireless network from the mining vehicle to the mine control system.

The idea underlying the invention is that at least one section of a mine is provided with a wireless network. The wireless network is used in data transmission between a terminal in a mining vehicle and a mine control system, and further in determining the location of the mining vehicle. At least when the mining vehicle is within the coverage area of one or more base stations in the wireless network, the location of the mining vehicle can be determined with sufficient accuracy for monitoring. Not all sections of a mine are provided with a comprehensive wireless network suitable for determining location, but a section of the mine is provided only with a network for maintaining a data communication connection between the mine control system and the mining vehicle. In the sections outside the comprehensive network, means provided in the mining vehicle are used for determining its location. The location data obtained by the means are transmitted to the mine control system over the data communication connection. The mine control system may employ the location data it has received for monitoring mining vehicles and controlling their operation.

An advantage of the invention is that the mine control system may monitor the mining vehicle so that the control system is substantially continuously aware at least of the approximate location of the mining vehicle. Since the location of mining vehicles operating in the mine can be monitored, the tasks performed in the mine can be controlled more effectively and the realization of mine-related plans monitored. A further advantage is that the system according to the invention reduces the need for building a fixed infrastructure in the mine. A wireless network can be created in the mine sections where the conditions for placing base stations are good and the amount of vehicular traffic is large. Such places include unloading stations, connecting tunnels and other main passages. Instead, the mine sections with the severest conditions are not provided with a comprehensive wireless network but equipped with bases stations only for establishing a data communication connection. Thus in production tunnels and the like, the location of a mining vehicle can be monitored by location determination based on dead reckoning, i.e. distance and direction, for example. In other words, the invention utilizes two different arrangements for determining the location of a mining vehicle in a flexible manner. Furthermore, since the object of the invention is to monitor the location and movements of a mining vehicle in a mine, the location determination does not need to be as accurate as in the controlling of a mining vehicle in a mine, for example.

The idea underlying an embodiment of the invention is that the mining vehicle includes means for 'dead reckoning'. The means include at least means for measuring the distance traveled and determining the vehicle's direction. The measurement means required by the dead reckoning are relatively simple, reliable and sufficiently accurate.

The idea underlying an embodiment of the invention is that the wireless network is a radio network.

The idea underlying an embodiment of the invention is that the wireless network is a wireless local area network, for example WLAN (Wireless Local Area Network). Other local area network techniques are also applicable.

The idea underlying an embodiment of the invention is that the radio network is a mobile communication network.

The idea underlying an embodiment of the invention is that the mining vehicle is a manned vehicle controlled by an operator. The mine control system or mine supervisory personnel may be assigned to give working instructions to the operator on the basis of monitoring.

The idea underlying an embodiment of the invention is that the location of the mining vehicle is determined continuously by at least one measuring device provided in the mining vehicle. In the first mine section, the location of the mining vehicle is updated to correspond to the location determined by means of the wireless network, in which case any measurement error that has occurred in the second mine section can be eliminated.

BRIEF DESCRIPTION OF THE FIGURES

The invention will be described in greater detail in the accompanying drawings, in which FIG. 1 is a schematic side view of a mining vehicle, FIG. 2 is a schematic top view of a solution for determining the location of a mining vehicle in a wireless network, FIG. 3 is a schematic top view of another solution for determining the location of a mining vehicle in a wireless network.

The figures show the invention in a simplified manner for the sake of clarity. In the figures, like reference numbers identify like elements.

DETAILED DESCRIPTION OF THE INVENTION

Figure 4:
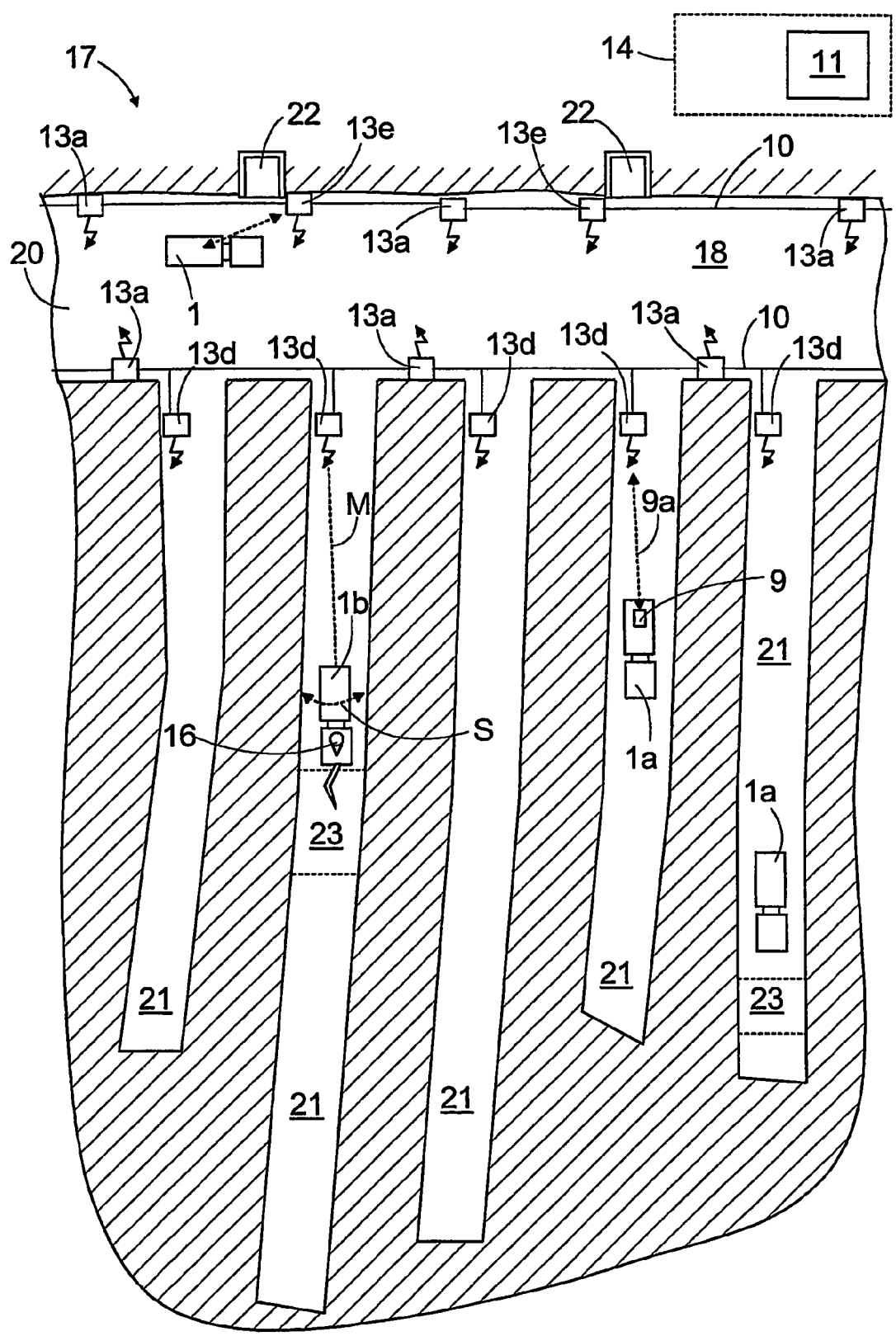
FIG. 4 is a schematic top view of a mine section provided with a monitoring system according to the invention.

FIG. 1 shows a mining vehicle 1, in this case a loading vehicle, whose front end comprises a bucket for transporting and loading mined material. Alternatively, the mining vehicle 1 may be a rock drilling rig or a transport vehicle provided with a platform, for example. The mining vehicle 1 comprises a movable chassis 2 having a plurality of wheels 3, of which at least one is a traction wheel driven by an engine 4 through power transmission 5. The power transmission 5 typically includes a gear box 6 and necessary cardan shafts 7, differentials and other power transmission means for transferring the rotation torque from the engine 4 to the traction wheels. Furthermore, the mining vehicle 1 is provided with a control system comprising at least a first control unit 8 arranged to control the actuators in the mining vehicle 1 for steering and using the vehicle. The mining vehicle 1 may further comprise a data transmission unit 9 or a terminal, by means of which the first control unit 8 may establish a data transfer connection 9a to a wireless network 10 in the mine and further use the wireless network 10 to communicate with a second control unit 12 included in the mine control system 11. When several mining vehicles are operating simultaneously in a mine 17, the network 10 may be arranged to identify an identifier or code transmitted by the mining vehicle 1, enabling the identification of each mining vehicle 1 operating in the mine 17 at all times. The wireless network 10 comprises a plurality of base stations 13, which may communicate with each other and with units outside the network. The connection between the wireless network 10 and the mine control system 11 may be wireless or wired. The mine control system 11 and the second control unit 12 included in it may be located in a control cabin 14, which may be arranged outside the mine. The control units 8 and 12 may be computers or the like.

The mining vehicle 1 may be manned, in which case it comprises a control cabin 15 for an operator 16. The operator 16 is responsible for steering the manned mining vehicle 1, and thus no exact position is necessarily required for steering such a mining vehicle 1. On the other hand, the mining vehicle 1 may also be unmanned. An unmanned mining vehicle may be controlled by remote control from a separate control cabin based on a video image, for example, or it may be an independently controlled mining vehicle provided with a navigation system.

The mining vehicle 1 may comprise means for determining its location. The location of the mining vehicle 1 can be determined when the distance traveled and the direction of the vehicle are known. The direction of the mining vehicle can be found out by means of a gyroscope or the like, for instance. The distance traveled can be calculated in the control unit 8 of the vehicle after suitable sensors 30 have first measured rotational data directly from a wheel 3 of the vehicle 1, or alternatively indirectly from the power transmission 5 or the engine 4. The rotational motion of the wheel 3 can be calculated in the control system, provided that the transmission ratios are known. Furthermore, the control unit 8 is able to calculate the magnitude of the distance traveled by the vehicle 1 on the basis of the rotational motion and diameter of the wheel 3. The location data can be transmitted using the wireless network 10 to the second control unit 12 belonging to the mine control system 11. Employing the location data, the mine control system 11 may monitor the movement of the mining vehicle 1 in the mine according to the inventive idea. The mine control system 11 may be provided with a user interface for manual monitoring of the operation of mining vehicles 1 in the mine 17.

Furthermore, the mine control system 11 may keep a register of the movements of mining vehicles 1 in the mine, and further provide various reports and messages on monitoring results. In addition, the control system 11 may be arranged to give new work instructions to the operator of the mining vehicle on the basis of monitoring.

When determined by the measuring devices provided in the mining vehicle 1, the location may be erroneous. For example, skidding of wheels and irregularities on the driving surface may cause errors, which can be corrected by location determination based on the wireless network 10.

In addition to the above-mentioned devices, the mining vehicle 1 may comprise other devices for determining the location. Examples of such devices are various laser scanners 19, ultrasonic devices and the like.

FIG. 2 illustrates a way of determining the location of the mining vehicle 1 in the wireless network 10. The mine is provided with a first mine section 18, including at least one wireless network 10. The wireless network may comprise a plurality of base stations 13a to 13c. When the mining vehicle 1 moves in the coverage area of the wireless network 10, a data transmission unit 9 provided in the mining vehicle 1 may establish a connection to one base station 13a to 13c at a time on the basis of predetermined criteria. The connection may be established to the base station closest to the mining vehicle 1 at a given time, in this case to base station 13a whose signal level is the highest. In that case, the coverage between the base station 13a and the data transmission unit 9 of the mining vehicle 1 is good. When the mining vehicle 1 moves forward in the mine 17 to the coverage area of the next base station 13b, the data transmission connection can be switched to base station 13b. This selection of base stations 13a to 13 in the network 10 is part of conventional telecommunications technology. Connecting to the base station 13a to 13c can also be used in determining the location of the mining vehicle 1. In that case, the simplest way is to select the location of the base station 13a to 13c with which the mining vehicle 1 communicates at a given time as the approximate location of the mining vehicle 1. The locations of all base stations 13 are known to the control system, enabling monitoring the movements of the mining vehicle 1 in the mine with sufficient accuracy. An advantage of the location determination based on the selection of base stations 13 is that it is simple to implement and sufficiently accurate for monitoring. If necessary, a simple way of improving the accuracy of location determination performed in the network 10 is to increase the number of base stations 13, i.e. to improve the network density. Furthermore, base stations 13 may be placed in the mine 17 in locations critical to monitoring. Such locations may be unloading and loading sites, for example.

FIG. 3 illustrates another solution for determining the location in the wireless network 10. The location of the mining vehicle 1 can be determined by calculating its location in the coverage area of two or more base stations on the basis of the level of the signals transmitted by the base stations 13. This allows determination of relatively accurate coordinates for the mining vehicle 1.

For example, the technique described in WO 02/054813 for determining the location in a wireless network can be applied in the invention.

The system according to the invention can further utilize any wireless network 10 based on base stations and suitable both for transmitting data and for determining the location. Such networks include a radio network, for example a mobile communication network. Examples of mobile communications networks are GSM (Global System for Mobile Communication), GPRS (General Packet Radio Service) and UMTS (Universal Mobile Telecommunications System) networks. The wireless network may also be a WLAN network (Wireless Local Area Network). If necessary, other wireless local area network techniques described in IEEE 802.11 standard may also be applied. Other examples of wireless local area networks include HiperLAN network (High Performance Radio Local Area Network) and BRAN network (Broadband Radio Access Network).

FIG. 4 illustrates part of an underground mine 17. The mine 17 may also be an opencast mine or the like. The mine 17 may comprise one or more connecting tunnels 20 and one or more production tunnels 21. Actual rock breaking, for example by blasting or mining, takes place in the production tunnel 21. The rock material broken from the rock can be transported with a transporting vehicle 1a from the production tunnel 21 to the connection tunnel 20 and further to the unloading site 22, such as a transporting shaft or a suitable conveyor. Several production tunnels 21 may be connected to the connecting tunnel 20, and on the other hand, the connecting tunnel 20 may be provided with several unloading sites 22, as shown in FIG. 4. The production tunnels 21 may be very long, up to several hundreds of meters long. In addition, the conditions in the production tunnels are severe because of drilling and blasting, for example, for which reason it is difficult to build a complete wireless network in the production tunnels 21. The front end of each production tunnel 21 can be, however, provided with a base station 13d, by means of which the transporting vehicle 1a operating in the production tunnel 21, the rock drilling rig 1b or any other mining vehicle can establish a data communication connection 9a to the mine control system 11. The production tunnel 21 may include one or more critical locations 23 where the mining vehicle 1a, 1b should operate. Such critical locations 23 may include predetermined drilling sites, loading sites, etc. The operation of mining vehicles 1a, 1b in such critical locations 23 is monitored by the mine control system 11. The production tunnel 21 where each mining vehicle 1a, 1b operates at a given time is known on the basis of the data communication connection 9a. More accurate information cannot be obtained on the location of the mining vehicles 1a, 1b in the production tunnel 21 by means of the wireless network 10 since the wireless network 10 built in the production tunnels 21 is not sufficiently comprehensive for use in location determination. Thus the wireless network 10 is used in the production tunnels 21 mainly for data transmission between the terminal 9 in the mining vehicle 1 and the mine control system 11. When the mining vehicle 1 is in the production tunnel 21, a more accurate location can be determined by the means provided in the mining vehicle 1. The location can be determined by measuring the distance M traveled and determining the direction S of travel. The location thus obtained is sufficiently accurate at least for finding out whether the mining vehicle 1 has operated in a pre-planned manner in the predetermined critical location 23.

In the mine according to FIG. 4, a wireless network 10 is formed for a section 18 of the connecting tunnel 20. Firstly, the network 10 can be used for data transmission between the mining vehicles 1 and the mine control system 11. Secondly, the network 10 can be used for determining the location of the mining vehicles 1 in its coverage area. The mining vehicles in the mine section 18 are thus continuously within the coverage area of at least two base stations 13, enabling location determination in the network 10 on the basis of signal level, for example. Furthermore, one or more additional base stations 13a can be arranged close to the critical sites, such as unloading sites 22, in the mine section 18. Thus the location determination and monitoring may be relatively accurate on the loading sites 22. Visits to the coverage area of the additional base station 13e can be registered.

It is also feasible that the means provided in the mining vehicle 1 determine location data continuously, i.e. also during operation in the mine section 18, and transmit them to the mine control system 11. Each time the mining vehicle arrives from the production tunnel 21 at the mine section 18, the location can be checked by the network 10. In that case, dead reckoning-based location determination can be corrected if it includes errors. In this solution, the determination of the mining vehicle 1 location is thus always performed on the basis of the location determination provided in the mining vehicle 1, and the network 10 is only used for improving accuracy.

The drawings and the related description are only intended to illustrate the inventive concept. The details of the invention may vary within the scope of the claims.

The invention claimed is:

1. A method of monitoring the location of a mining vehicle in a mine, the method comprising:
   determining data on the location of at least one mining vehicle in the mine by at least one measuring device provided in the mining vehicle;
   transmitting the location data to a mine control system;
   employing the obtained location data in the mine control system for monitoring the operation of the mining vehicle;
   providing at least one first section and at least one second section in the mine;
   providing at least one wireless data communication network for the first mine section which communicates with the mine control system and includes at least one signal transmitting base station for establishing a data communication connection between the mining vehicle and the wireless data communication network, the mining vehicle being in the coverage area of at least one base station in the first mine section;
   arranging at least one base station in the second mine section solely for establishing a data communication connection between the mining vehicle and the wireless data communication network in the first mine section, wherein the at least one base station in the second mine section does not determine the location of the mining vehicle;

continuously determining the location of the mining vehicle as the mining vehicle moves in the first mine section by means of positioning performed in the wireless data communication network on the basis of the location of the at least one signal transmitting base station in the first mine section;

and determining the location of the mining vehicle in the second mine section only by the at least one measuring device provided in the mining vehicle and transmitting the location data to the mine control system over the wireless data communication network of the first mine section.

2. A method according to claim 1, comprising:
determining the location of the mining vehicle in the second mine section by calculating the distance traveled and determining the direction of travel.

3. A method according to claim 1, comprising:
monitoring the location of a manned mining vehicle in the mine,
and transmitting instructions to the operator of the mining vehicle on the basis of the monitoring carried out.

4. A method according to claim 1, comprising:
forming the first mine section in a connecting tunnel,
and forming the second mine section in a production tunnel.

5. A method according to claim 1, comprising:
determining the location of the mining vehicle continuously by at least one measuring device provided in the mining vehicle,
comparing the location determined by the measuring device with the location determined by the wireless network when in the first mine section,
and updating the location of the mining vehicle to correspond to the location determined by the wireless network.

6. A method according to claim 1, comprising:
placing additional base stations belonging to the wireless network in predetermined critical locations in the mine,
and registering the visits of the mining vehicle to the coverage area of the additional base stations in the mine control system.

7. A method according to claim 1, comprising:
providing the wireless network in the first mine section with a plurality of base stations; establishing a connection to one base station at time when the mine vehicle is moved in the first mine section;
creating communication between the mine vehicle and the base station whose signal level is the highest in the wireless network;
and selecting the location of the base station with which the mining vehicle communicates at a given time as the location of the mining vehicle.

8. A method according to claim 1, comprising:
providing the wireless network in the first mine section with a plurality of base stations, which each have a coverage area of transmitted signals;
and calculating the position of the mine vehicle in the coverage area of at least two base stations on the basis of the level of signals transmitted by the base stations.

9. A method according to claim 1, comprising:
using the monitoring results for keeping a register of the movements of the mine vehicle in the mine.

10. A system for monitoring the location of a mining vehicle in a mine, the system comprising:
means for determining the location of the mining vehicle;
a mine control system;
at least one control unit arranged in the mining vehicle;
at least one measuring device arranged in the mining vehicle;
at least one wireless network for data transmission between the control unit of the mining vehicle and the mine control system;
at least one signal transmitting base station for creating a wireless data communication network,
and wherein,
the mine comprises at least one first section provided with at least one wireless data communication network, the mining vehicle being in the coverage area of signal transmitted from at least one base station in the first mine section;
the mine comprises at least one second section provided with at least one base station solely for establishing a data communication connection between the control unit of the mining vehicle and the mine control system, wherein the at least one base station in the second mine section does not determine the location of the mining vehicle;
the location of the mining vehicle as the mining vehicle moves in the first mine section is arranged to be continuously determined using positioning performed in the wireless data communication network on the basis of the location of the at least one signal transmitting base station in the first mine section;
the location of the mining vehicle in the second mine section is arranged to be determined only by the at least one measuring device provided in the mining vehicle,
and wherein location data are arranged to be transmitted in the second mine section over the wireless network of the first mine section from the mining vehicle to the mine control system.

11. A system according to claim 10, wherein
the wireless network is a radio telephone network.

12. A system according to claim 10, wherein
the mining vehicle comprises at least one measuring device for determining the distance traveled and at least one measuring device for determining the direction of the mining vehicle.

13. A system according to claim 10, wherein
the first mine section is provided with at least one predetermined critical location,
and at least one additional base station is arranged in the immediate vicinity of the critical location.

14. A system according to claim 10, wherein
the positioning to be performed in the wireless network is arranged to be carried out on the basis of the location of the base station.

* * * * *